US008495546B1

(12) United States Patent
Chin et al.

(10) Patent No.: US 8,495,546 B1
(45) Date of Patent: Jul. 23, 2013

(54) METHOD FOR SIMPLIFYING RTL SCHEMATIC BY GROUPING NODES INTO A CLOUD

(75) Inventors: Choi Phaik Chin, Penang (MY); Denis Chuan Hu Goh, Penang (MY)

(73) Assignee: Altera Corporation, San Jose, CA (US)

( * ) Notice: Subject to any disclaimer, the term of this patent is extended or adjusted under 35 U.S.C. 154(b) by 656 days.

(21) Appl. No.: 12/128,487

(22) Filed: May 28, 2008

(51) Int. Cl.
*G06F 17/50* (2006.01)

(52) U.S. Cl.
USPC .......................................... 716/119; 716/120

(58) Field of Classification Search
USPC .................................................. 716/118–125
See application file for complete search history.

(56) References Cited

U.S. PATENT DOCUMENTS

| | | | |
|---|---|---|---|
| 5,956,498 A * | 9/1999 | Mangelsdorf | 716/106 |
| 6,301,687 B1 * | 10/2001 | Jain et al. | 716/107 |
| 6,490,716 B1 * | 12/2002 | Gupta et al. | 716/104 |
| 7,418,690 B1 * | 8/2008 | Van Antwerpen | 716/116 |
| 7,441,212 B1 * | 10/2008 | van Antwerpen et al. | 716/4 |
| 7,784,008 B1 * | 8/2010 | Hutton et al. | 716/12 |
| 8,122,396 B1 * | 2/2012 | Antwerpen | 716/100 |
| 2004/0103377 A1 * | 5/2004 | Eaton et al. | 716/1 |
| 2006/0248481 A1 * | 11/2006 | Baumgartner et al. | 716/2 |
| 2007/0150846 A1 * | 6/2007 | Furnish et al. | 716/8 |

OTHER PUBLICATIONS

U.S. Appl. No. 11/330,931, filed Jan. 11, 2006 (20 pages).

* cited by examiner

*Primary Examiner* — Binh Tat
(74) *Attorney, Agent, or Firm* — Weaver Austin Villeneuve & Sampson LLP

(57) ABSTRACT

The number of nodes in an RTL schematic is reduced in a process of cloud grouping, a process whereby nodes that are not specified to be of interest will be grouped into a cloud to the extent possible. This results in a much simplified schematic as the remaining nodes within the schematic will be those nodes that the users desire to see. Analysis of all nodes including those designated as cut nodes is performed to determine what circuitry can or cannot be simplified. The user will also have the option to revert to the original schematic if viewing more than the cut nodes is desirable.

22 Claims, 13 Drawing Sheets

METHOD FOR SIMPLIFYING RTL SCHEMATIC BY GROUPING NODES INTO A CLOUD

BACKGROUND OF THE INVENTION

The present invention relates generally to software for designing integrated circuits and more specifically to a technique to simplify the schematic of a Register Transfer Level (RTL) netlist.

A typical design cycle for an integrated circuit, referred to as compilation, starts with an extraction phase, followed by a logic synthesis phase, and, depending upon the target hardware architecture, either a layout phase or fitting and assembly phases.

In addition to implementing their desired functions, designs typically must satisfy one or more additional design goals, such as operating speed, power consumption, and/or programmable device resource consumption. Typically, the predicted performance of a design with respect to one or more design goals is determined through simulation or analysis following a phase of the compilation. The designer can evaluate the predicted performance of the design and decide to either accept the results of the compilation or modify the design to improve its predicted performance, and hopefully its actual performance as well.

Visualization applications assist designers in evaluating predicted performance of a design. Visualization applications present predicted performance information of a design in a number of different graphical and text formats. Using visualization applications, designers can identify portions of the design that do not satisfy design goals. Visualization applications may also help designers identify portions of the design that can be improved to meet or exceed design goals.

Many typical digital designs include a number of registers. Each register is capable of storing one or more bits of data. Registers are often connected together via combinatorial logic. In many cases, the set of connections between two or more registers includes a large number of paths, each connecting one bit of a source register with one or more bits of at least one destination register. For example, there are up to 256 different paths between two 16 bit registers.

Visualization applications typically present predicted performance information on a path level view. These visualization applications annotate each path with its predicted performance information. As a result, designers tend to focus their optimization efforts on improving the performance of individual paths. However, the performance of paths connected with the same registers often are interrelated. Thus, when a designer improves the performance, such as the timing, of one path between registers, the performance of another path between these registers may get worse. In these situations, the designer merely shifts a problem to different paths, rather than finding a solution that improves the performance of the overall design. This problem can occur in any type of integrated circuit design and is especially frequent with programmable devices such as field programmable gate arrays, which route all of the paths between source and destination registers independently.

SUMMARY OF THE INVENTION

The disclosed embodiments reduce the number of nodes in an RTL schematic in a process of cloud grouping, a process whereby nodes that are not specified to be of interest will be grouped into a cloud to the extent possible. This results in a much simplified schematic as the remaining nodes within the schematic will be those nodes that the users desire to see. Analysis of all nodes including those designated as cut nodes is performed to determine what circuitry can or cannot be simplified. The user will also have the option to revert to the original schematic if viewing more than the cut nodes is desirable.

One aspect relates to a method of generating a visualization of a design. The method comprises receiving a design including a plurality of circuit nodes and a plurality of paths interconnecting the circuit nodes, enabling a user to select from the plurality of circuit nodes and specify selected circuit nodes as cut nodes, analyzing the input signals of the cut node to determine whether the driving signal is a cut node. If the driving signal is not a cut node, the system will continue traversing until it reaches the cut node or the input pin. All nodes between the source and destination cut nodes will then be grouped into a single entity to form a cloud node. The number of driving signal can be more than 1 as the system traverses through the logic path to find the cut node or the input pin. These source signals will then be used to feed the newly formed cloud node and each cloud node will only have a single output signal that feeds the initial input signal of the initial cut node.

Another aspect relates to a method of generating a visualization of a design. The method comprises receiving a design including a plurality of circuit nodes and a plurality of paths interconnecting the circuit nodes, enabling a user to select from the plurality of circuit nodes, specifying selected circuit nodes as cut nodes, analyzing the input signals to non cut nodes, analyzing the output signals from non cut nodes. Based upon the analysis of the input and output signals, it is then determined if some of the plurality of paths and non cut nodes may be removed from the diagram and properly represented as a cloud node. A further aspect of the method involves ceasing to display the plurality of paths and non cut nodes properly represented as a cloud node and instead displaying one or more cloud nodes representative of the plurality of paths and non cut nodes properly represented as a cloud node.

DETAILED DESCRIPTION OF THE PREFERRED EMBODIMENTS

Figure 1:
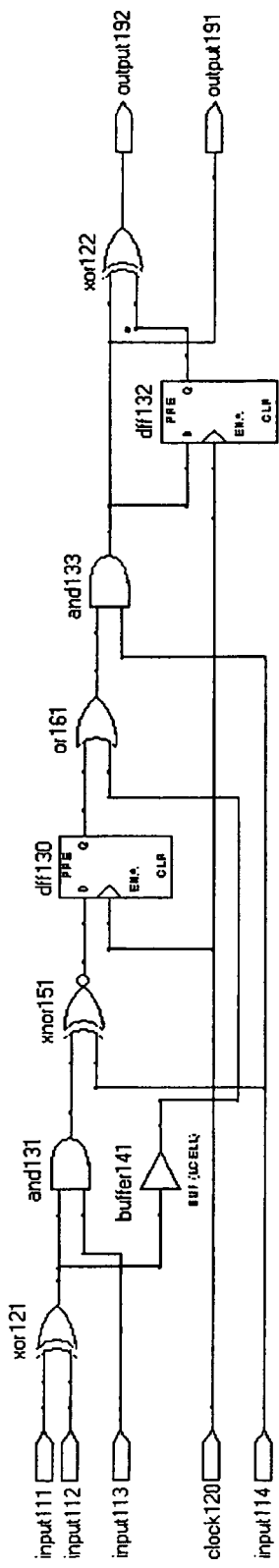
FIG. 1 illustrates a typical RTL schematic diagram/circuit 100.

An RTL viewer is a design tool which enables users to view circuit designs at a schematic level. A good RTL graphical representation eases human eyes navigation on the diagram. When there are a lot of nodes and pins within a diagram, human eyes take relatively longer time to find a portion of the circuit. A diagram with relatively lesser nodes simplifies tracing. Often, when analyzing a circuit design, the user is only interested in a small portion of the circuitry. The challenge for automated viewer tools is to eliminate unwanted nodes from the diagram, such that human eyes can take relatively shorter time to find the target nodes.

To date, most automated viewers of existing tools reduce node count in schematic diagram by grouping all pins and nodes into buses and arrays. However, none of the existing tools take further step to further reduce the number of nodes in a RTL schematic.

With the increasing complexity in the ASIC design, the ability to maintain a readable schematic becomes a challenge. Even with the existing grouping algorithms that are in place today, they do not seem to be able to simplify the schematic to a point that eases the debugging process. Hence, embodiments of the present invention allow the user to specify what should and should not be displayed on the screen within the RTL schematic.

In debugging a circuitry most users are often interested on some specific node types only, and not the whole schematic. By grouping all nodes a user does not desire to see into clouds, determining the relationship between two nodes of interest becomes possible within a glance.

In view of this fact, the embodiments further reduce the number of nodes in a RTL schematic in a process of cloud grouping. Cloud grouping is a grouping mechanism whereby all nodes that are not in the interest list will be grouped into a cloud. This will result in a much simplified schematic as the remaining nodes within the schematic will be those nodes that the users desire to see. The nodes specified to be of interest (and placed in the interest list) are referred to as "cut nodes." In short, cut nodes are nodes that users wish to see in a schematic. The user will also have the option to revert to the original schematic if viewing more than the cut nodes is desirable.

Prior art tools only reduce node counts in a schematic diagram by grouping pins and nodes into buses and arrays, partitioned into multiple pages. This is however, insufficient as the schematic may still be overly complicated and difficult to quickly assess for a circuit designer. In particular, prior art grouping of similar pins and nodes into buses and arrays does not necessarily reduce the number of nodes in a schematic diagram, especially with the ever increasing complexity of circuitry. In general, designers are often not interested in the whole schematic, but need to focus on specific parts of it. Most often, designers are only interested in one or more specific types of nodes within a RTL schematic. For an example, designers may only be interested on register nodes in analyzing a few critical timing paths. However, finding a specific node within a full detailed circuit diagram can be difficult at times especially for those designs that have a lot of nodes in the same schematic page. All this make analyzing the schematic difficult.

Explanation of how an RTL schematic is simplified will be given below with reference to the Figures. For the sake of simplicity, the cut nodes shown are registers and pins, but as mentioned earlier, the cut nodes may alternatively comprise any type of node, e.g. DSPs, RAMs, or combinatorial logics. As mentioned earlier, a user may specify what circuit components should be designated as cut-nodes.

In the described embodiments, the input signals to a cloud are always unique (duplicate signals will be eliminated) and there can only be a single output feeding directly to the cut node input port. This differs from prior art simplification techniques, and results in much clearer schematic diagrams.

Figure 2:
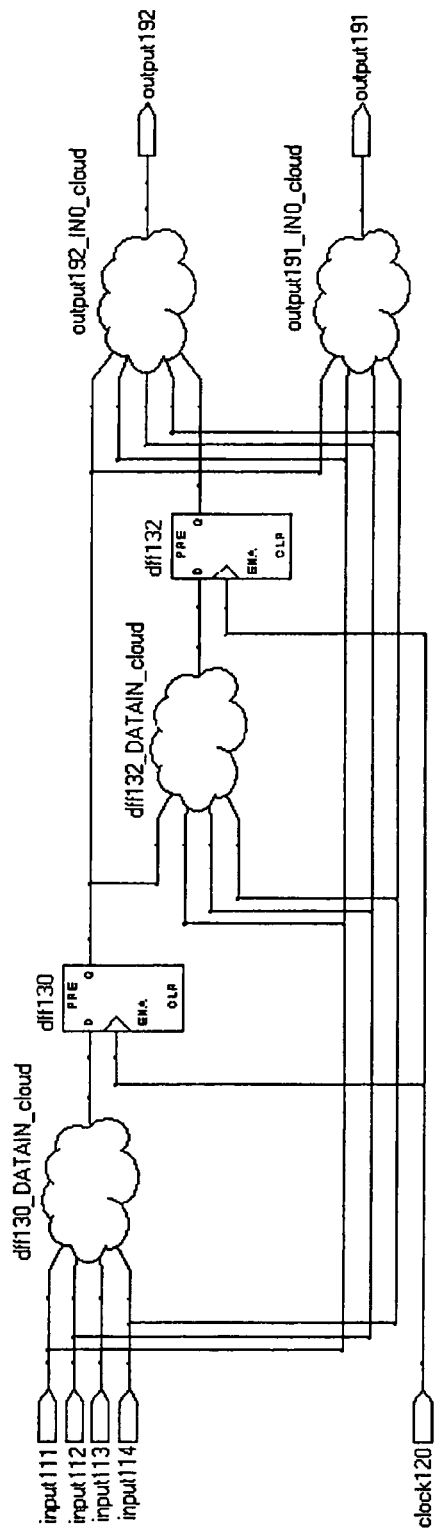
FIG. 2 illustrates grouping of combinatorial logic of the diagram/circuit 100.

Given an RTL schematic diagram like FIG. 1, we can then simplify this design by grouping the combinatorial logics (non cut nodes) into a cloud as shown in FIG. 2.

In order to group non cut nodes (in this example, it is combinatorial logic) into a cloud node(s), we specify a set of rules for cloud characteristics. Firstly, a cloud can only have a single output. However, the output can feed more than 1 signal destination (fanout). Secondly, the cloud node must have at least 1 source signal. If there is more than 1 source signal, the source signal has to be unique from each other. In other words, there are no duplicates of source signals in a single cloud node.

Figure 3:
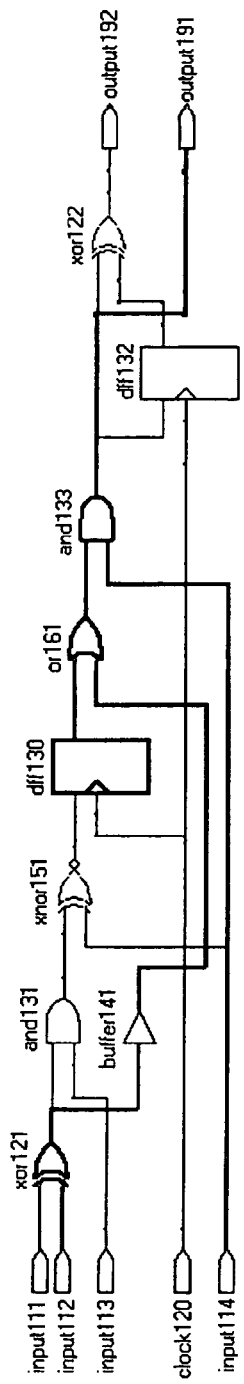
FIG. 3 illustrates identification of the combinatorial nodes path for output 191 of the diagram/circuit 100.

The algorithm begins with the destination input port. From the input port, we trace the source signal. The destination node or cut node in this case can be of any type and not just limited to output pins or registers. The user can even specify the combinatorial logic as the cut node or a DSP and RAM block as the cut node. If the source signal node is a combinatorial logic which could either be AND, OR, NOR, XOR, NAND, XNOR, BUFFERS, MUXES or OPERATOR node, then the node will be marked as a candidate of cloud grouping. For combinatorial nodes, we will continue traversing the RTL netlist until we come across a node that is not a combinatorial node type. Take, for example, the circuit shown in FIG. 1, if the destination node is given as output 191, FIG. 3 illustrates the path of the traversal as a bold line. Note that, the traversal ends at register dff 130, input 111, input 112 and input 114. These 4 nodes will in turn act as the source signals to the newly formed cloud node called output 191_IN0_cloud as indicated in FIG. 4.

Figure 4:
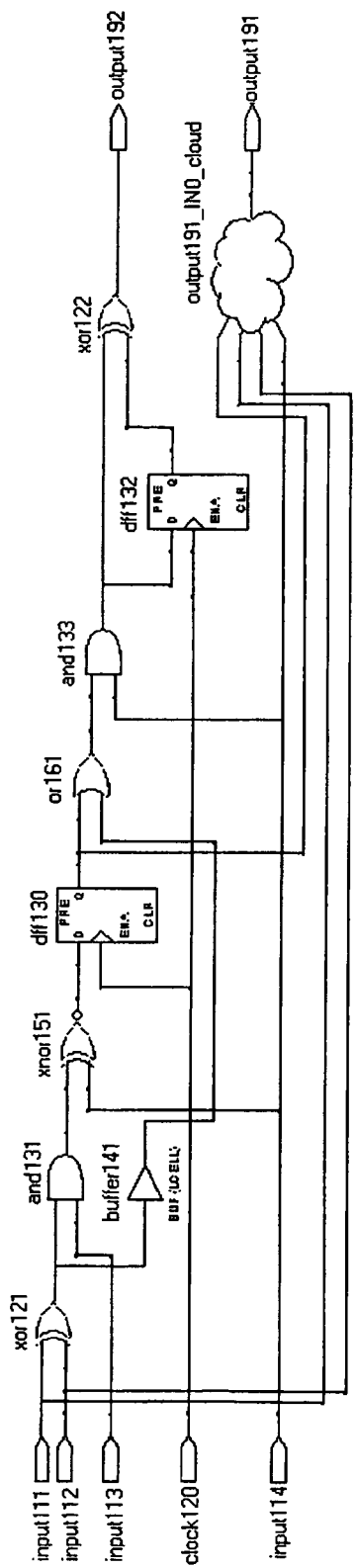
FIG. 4 illustrates grouping of the source combinatorial logics of output 191 of the diagram/circuit 100.

The cloud node of output 191_IN0_cloud shown in FIG. 4 comprises and 133, or 161, xor 121 and buffer 141. By grouping the combinatorial logics on the source signals of output 191, we can now trace the output 191 signal directly to the primary sources. Notice that the combinatorial logic nodes of and 133, or 161, xor 121, and buffer 141 still exist in FIG. 4. This is because these 4 combinatorial logic nodes are also feeding other logic gates. If any of these combinatorial nodes only fall within this path, then the node will be absorbed and not get displayed.

Figure 5:
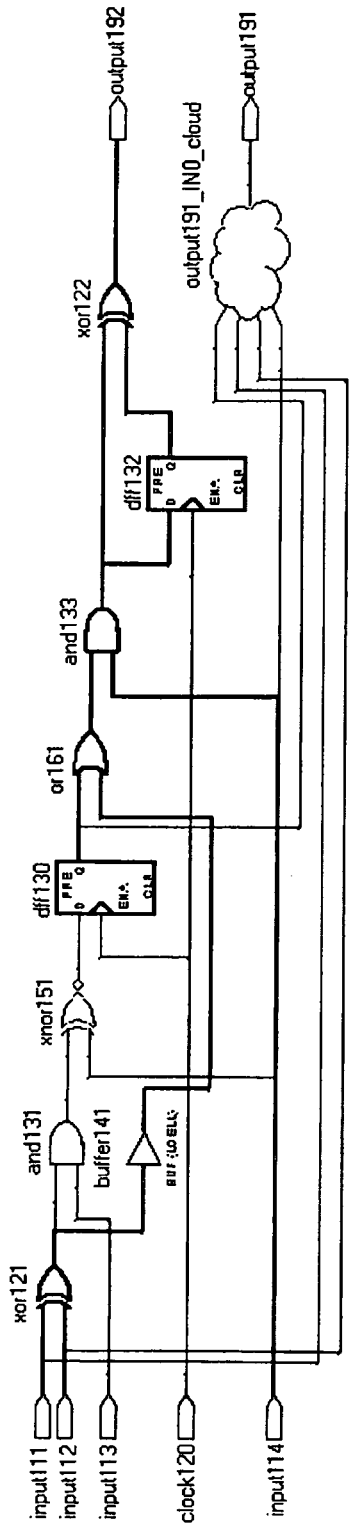
FIG. 5 illustrates identification of the combinatorial nodes path for output 192 of the diagram/circuit 100.
Figure 6:
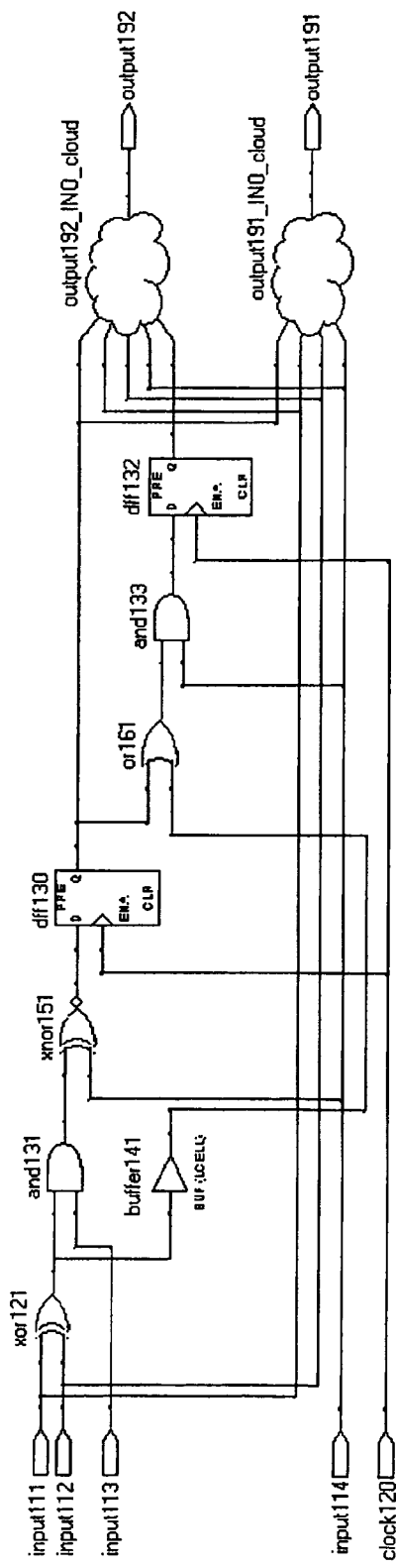
FIG. 6 illustrates grouping of the source combinatorial logics of output 192 of the diagram/circuit 100.

Based on FIG. 4, if continuing the cloud grouping process but this time targeted to output 192, the visited path for output 192 is shown in bold in FIG. 5. The end result from the cloud grouping process on output 192 is shown in FIG. 6. Notice that the combinatorial logic node of xor 122 is no longer shown as the node only falls within the output 192 path.

Figure 7:
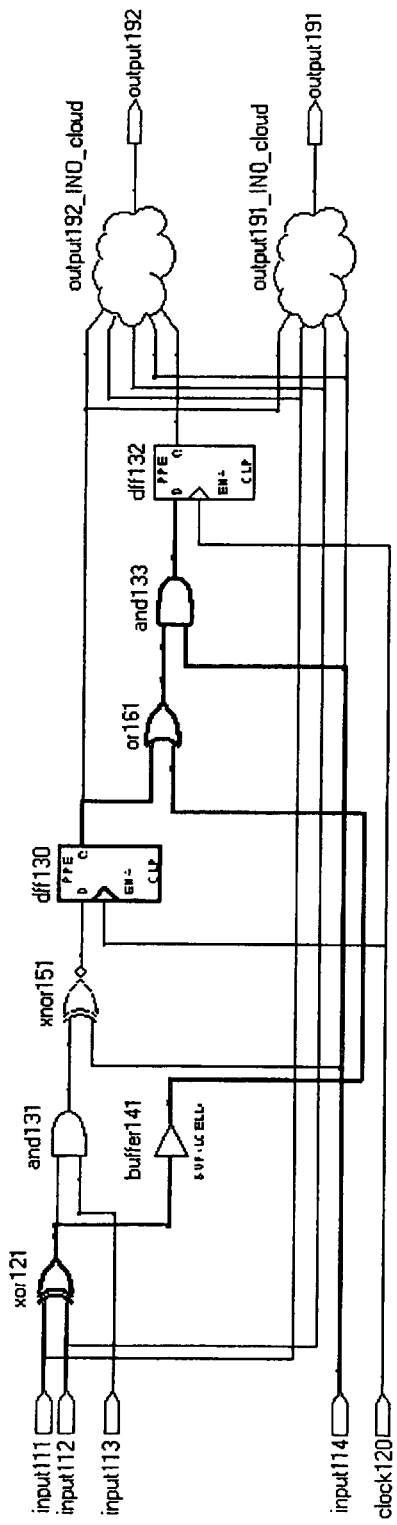
FIG. 7 illustrates identifying the combinatorial nodes path for dff 132 of the diagram/circuit 100.
Figure 8:
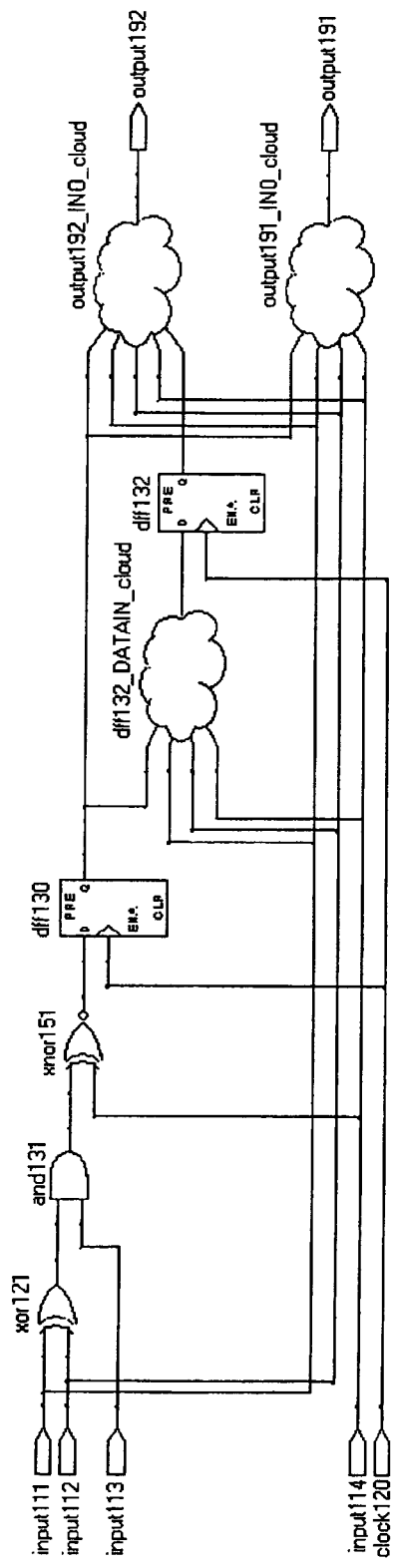
FIG. 8 illustrates grouping of the source combinatorial logics of register dff 132 of the diagram/circuit 100.

Based on FIG. 6, if we continue the cloud grouping process but this time targeted to the register of dff 132, the traversing path is shown in FIG. 7 with the cloud formation shown in FIG. 8. Notice that the combinatorial logic nodes of or 161, and 133, and buffer 141 in FIG. 6 are no longer displayed after the cloud grouping process, as seen in FIG. 8.

Figure 9:
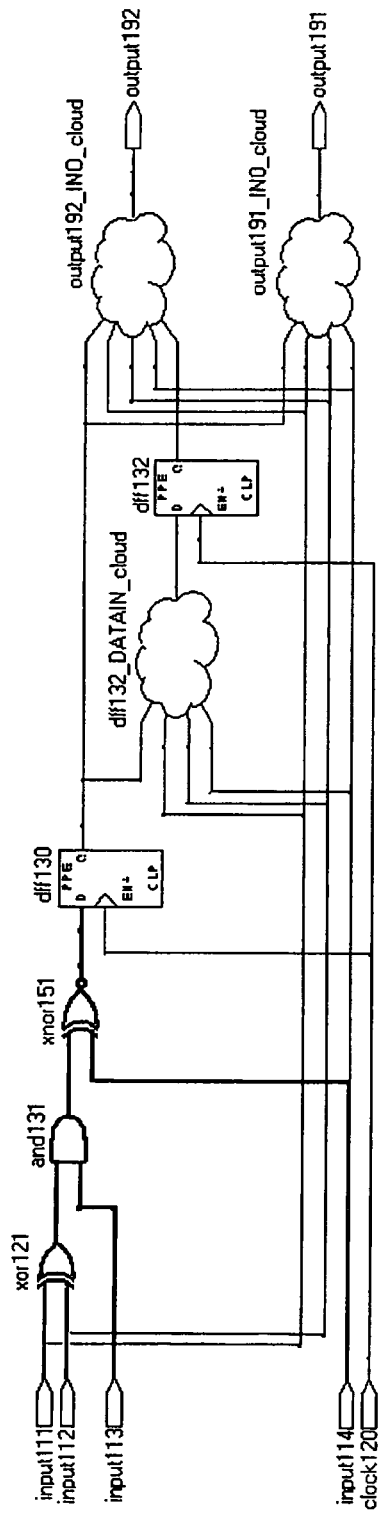
FIG. 9 illustrates identification of the combinatorial nodes path for dff 130 of the diagram/circuit 100.
Figure 10:
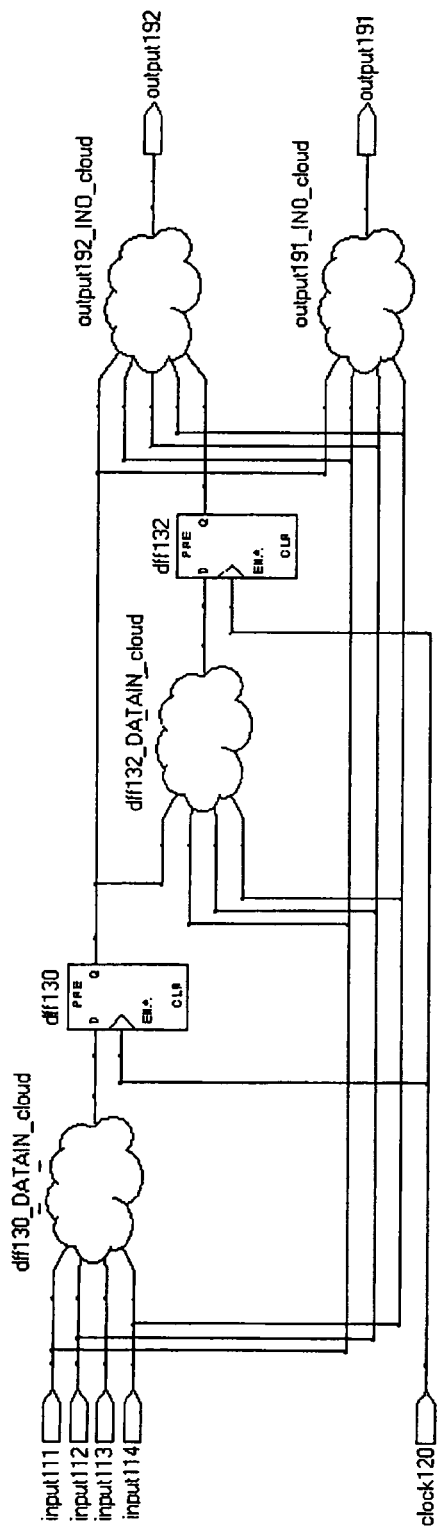
FIG. 10 illustrates grouping of the source combinatorial logics of register dff 130 of the diagram/circuit 100.

Based on FIG. 8, if we continue the cloud grouping process but this time targeted to the dff 130 register, the traversing path of dff 130 shown in bold in FIG. 9 results in the final diagram shown in FIG. 10.

In order to group the entire combinatorial logics of the circuitry, the entire netlist is traversed. While traversing nodes in a circuit, selected nodes are labeled as cut nodes. In a preferred embodiment a user selects nodes to label as a cut node while designing a circuit or after it has been designed. In alternative embodiments, certain types of nodes can be pre-designated as cut nodes. A cut node indicates the cut point of the cloud grouping. All non cut nodes between two cut nodes will be grouped into a single cloud. In the example illustrated in the figures above, logic nodes like registers, IOs, instances, rams, latches are categorized as cut nodes and they will not be grouped into cloud logic.

Figure 11:
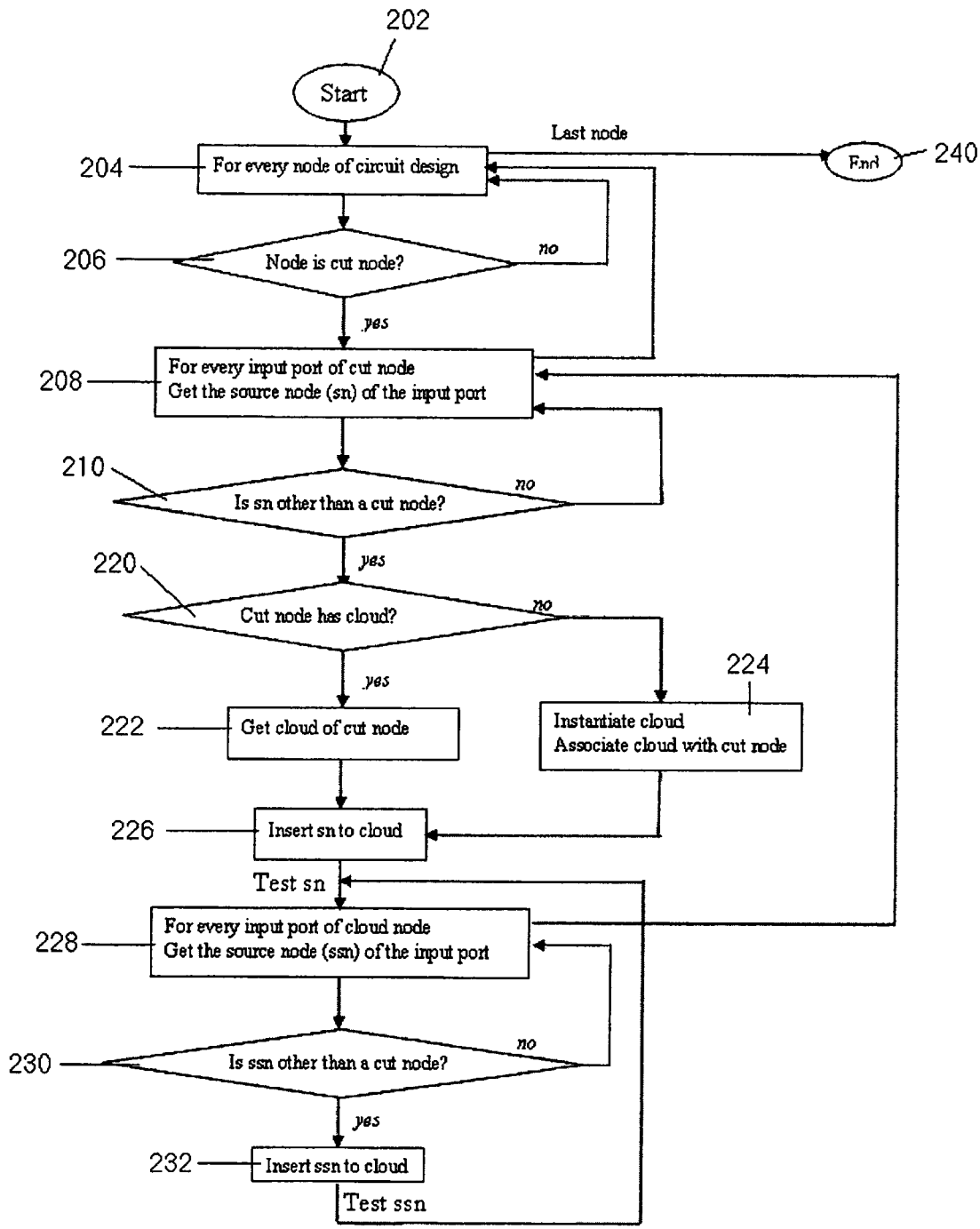
FIG. 11 is a flowchart of the process of cloud formation.

An embodiment of the traversing process 200 for cloud grouping is illustrated in the flow chart of FIG. 11. The process starts in step 202, and continues on in step 204 where the system checks to see if this is the last node and every node has been analyzed. If so, the process ends, as seen in step 240. If the node under analysis is not the last node, the process continues on to step 206, where the system checks to see if the node has been designated a cut node. If so, the system checks each of the input ports of the cut node, and gets the source nodes for each input port in step 208. Next, in step 210, the system then determines if each of the source nodes from step 208 are something other than a cut node (have not been designated a cut node). If the source node has not been designated a cut node, in step 220 the system checks to see if the cut node has a cloud associated with it. If so, then in step 222, the system retrieves the cloud of the cut node. If not, then in step 224 the system instantiates a cloud for the node (creates a cloud and associates it with the node).

In step 226, the source node is then inserted into the cloud, and in step 228 for every input port of the cloud node the system ascertains the source node of the input port ("SSN"). In other words, after the source node from step 208 is inserted into the cloud node, the system will check all the inputs of the inserted source node (from step 208). The system will return to step 208 after all inputs of the node have been analyzed. Then in step 230 the system checks if the SSN is something other than a cut node, or in other words, the system checks if the source node from step 208 is fed by nodes other than cut nodes, which means, the source (from step 228) to the source node from step 208 is a node other than a cut node. If not the system returns to step 228, but if so, the system proceeds to step 232 where the SSN is inserted into the cloud. The system then returns to step 228.

Figure 12:
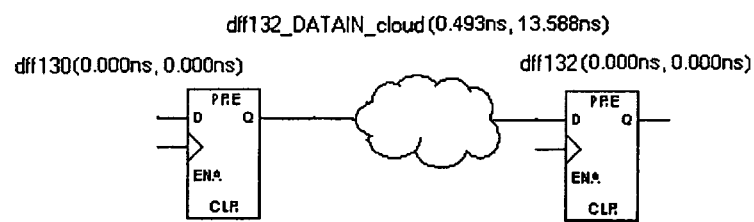
FIG. 12 is an example of a register-to-register timing path.

The system and method described herein gives users extra control over grouping attributes in an RTL Viewer. By specifying a list of node types as cut nodes, users control the types of nodes that will appear in a RTL schematic, as the system will automatically place circuitry not of interest into a cloud. As one of the example, by grouping all combinatorial logics between the register-to-register path, pin-to-register path, pin-to-pin path and register-to-pin path, the RTL schematic viewer provides more meaningful and useful representation of the timing path as it focuses on the registers and pins. This helps in timing analysis when using an RTL Viewer as the designer no longer has to trace and be distracted by long connections which sometimes span across multiple pages. Moreover, the designer can always choose to ungroup this cloud to get back to the original combinatorial nodes connection. See FIG. 12 for illustration on a simplified register-to-register timing path.

After a particular register-to-register timing path is targeted, the detailed timing path circuit can be revealed by ungrouping all the cloud's composition within the timing path. By ungrouping a cloud node, all its underlying combinatorial logics will be revealed. Likewise, these clouds can also be regrouped on demand. With this feature in place, users no longer need to trace through large amounts of logic that may not be of interest.

Figure 13:
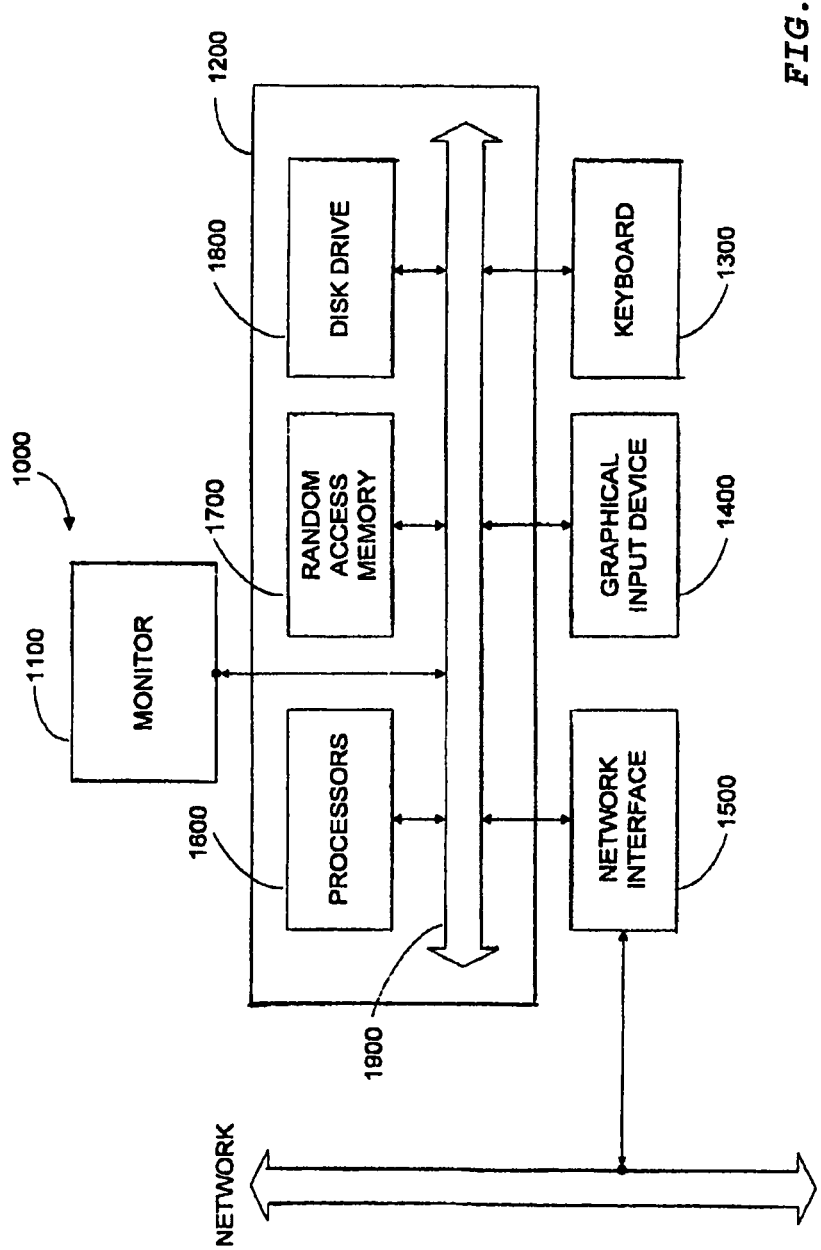
FIG. 13 illustrates a computer system 1000 suitable for implementing an embodiment of the invention.

FIG. 13 illustrates a computer system 1000 suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more general purpose processors 1600, and memory storage devices, such as a random access memory (RAM) 1700, disk drives 1800, and system bus 1900 interconnecting the above components. RAM 1700 and disk drive 1800 are examples of tangible media for storage of data, audio/video files, computer programs, applet interpreters or compilers, virtual machines, and embodiments of the herein described invention. Further embodiments of computer 1200 can include specialized input, output, and communications subsystems for configuring, operating, testing, and communicating with programmable devices. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

What is claimed is:

1. A method comprising:
    receiving, at a computer, a design including a plurality of circuit nodes, wherein circuit nodes of the plurality of circuit nodes are interconnected via a plurality of paths;
    receiving a user selection of a plurality of input and output circuit nodes from said plurality of circuit nodes, wherein said user selection forms a group of cut nodes, and wherein circuit nodes that are within the plurality of circuit nodes but are outside of said group of cut nodes form a group of noncut nodes;
    analyzing, by using a computer, a plurality of input signals to circuit nodes of said group of noncut nodes;
    determining to replace, in a visualization of the plurality of circuit nodes, two or more of the circuit nodes of said group of noncut nodes with a cloud node, wherein said determining is based upon the analyses of the input signals; and
    rendering on a display, a visualization of the plurality of circuit nodes, wherein a cloud node replaces two or more circuit nodes of said group of noncut nodes, and wherein the cloud node is located between at least one input circuit node of the group of cut nodes and at least one output circuit node of the group of cut nodes;
    wherein the determined two or more circuit nodes of said group of noncut nodes are the two or more noncut nodes replaced by the cloud node, and wherein the rendering comprises ceasing to display the determined two or more circuit nodes and displaying the cloud node in their place.

2. The method of claim 1 further comprising:
    providing a digital signal processor (DSP), a random access memory (RAM), or a register for user selection thereof as an output circuit node, and wherein the cloud node has a single output coupled directly to an input of the selected DSP, RAM, or the register.

3. The method of claim 1 further comprising:
analyzing output signals of circuit nodes of said group of noncut nodes, wherein replacement of said two or more circuit nodes of said group of noncut nodes is based on the analyses of the input and output signals.

4. The method of claim 1 further comprising displaying the cloud node in response to a user selection.

5. The method of claim 1 further comprising displaying the two or more circuit nodes in said group of noncut nodes, and wherein said two or more circuit nodes in said group of noncut nodes is replaced by the cloud node in response to a user selection thereof.

6. The method of claim 1 further comprising:
determining whether a circuit node in said group of noncut nodes is located on a first path of the design or a second path of the design; and wherein said two or more circuit nodes in said group of noncut nodes is replaced by the cloud node based on said determining.

7. The method of claim 6 further comprising:
determining whether the first and second paths are traversed;
determining whether a circuit node of said group of noncut nodes is located on the first path and the second path; and
wherein said two or more circuit nodes in said group of noncut nodes are rendered in the display in response to determining that said circuit node of said group of noncut nodes is located on the first path and the second path, and that the first path or the second path is traversed.

8. The method of claim 1, further comprising:
analyzing a plurality of output signals from the circuit nodes of said group of noncut nodes;
wherein determining to replace, in a visualization of the plurality of circuit nodes, two or more of the circuit nodes of said group of noncut nodes with a cloud node is based upon the analyses of the input and output signals.

9. The method of claim 8 further comprising:
providing a digital signal processor (DSP), a random access memory (RAM), or a register for user selection thereof as an output circuit node, and wherein the cloud node has a single output coupled directly to an input of the selected DSP, RAM, or the register.

10. The method of claim 8 further comprising:
determining whether a circuit node in said group of noncut nodes is located on a first path of the design or a second path of the design; and wherein said two or more circuit nodes in said group of noncut nodes is replaced by the cloud node based on said determining.

11. The method of claim 10 further comprising:
determining whether the first and second paths are traversed;
determining whether a circuit node of said group of noncut nodes is located on the first path and the second path; and
wherein said two or more circuit nodes in said group of noncut nodes are rendered in the display in response to determining that said circuit node of said group of noncut nodes is located on the first path and the second path, and that the first path or the second path is traversed.

12. The method of claim 8 further comprising displaying the cloud node in response to a user selection.

13. The method of claim 8 further comprising displaying the two or more circuit nodes in said group of noncut nodes, and wherein said two or more circuit nodes in said group of noncut nodes is replaced by the cloud node in response to a user selection thereof.

14. The method of claim 1 further comprising:
determining an input port associated with a circuit node in said group of cut nodes;
determining a first source node from the plurality of circuit nodes, the first source node coupled to said input port;
determining whether the first source node is a member of said group of cut circuit nodes;
instantiating a cloud node in response to determining that the first source node is not a member of said group of cut nodes;
associating the first source node with the cloud node; and
wherein the two or more noncut nodes replaced by the cloud node comprise the first source node.

15. The method of claim 14 further comprising:
checking an input of the first source node;
determining, based on said checking, whether one of the plurality of circuit nodes is a second source node associated with the first source node;
determining whether the second source node is a member of said group of cut circuit nodes; and
inserting the second source node into the cloud node based on determining that the second source node is associated with the first source node and is not a member of said group of cut nodes.

16. The method of claim 14 further comprising:
providing a digital signal processor (DSP), a random access memory (RAM), or a register for user selection thereof as an output circuit node, and wherein the cloud node has a single output coupled directly to an input of the selected DSP, RAM, or the register.

17. The method of claim 14 further comprising displaying the cloud node in response to a user selection.

18. The method of claim 14 further comprising displaying the two or more circuit nodes in said group of noncut nodes, and wherein said two or more circuit nodes in said group of noncut nodes is replaced by the cloud node in response to a user selection thereof.

19. The method of claim 14, further comprising:
determining whether a circuit node in said group of noncut nodes is located on a first path of the design or a second path of the design; and wherein said two or more circuit nodes in said group of noncut nodes is replaced by the cloud node based on said determining.

20. The method of claim 19 further comprising:
determining whether the first and second paths are traversed;
determining whether a circuit node of said group of noncut nodes is located on the first path and the second path; and
wherein said two or more circuit nodes in said group of noncut nodes are rendered in the display in response to determining that said circuit node of said group of noncut nodes is located on the first path and the second path, and that the first path or the second path is traversed.

21. An apparatus comprising:
memory, and
a processor, the processor configured to:
receive, at a computer, a design including a plurality of circuit nodes, wherein circuit nodes of the plurality of circuit nodes are interconnected via a plurality of paths;
receive a user selection of a plurality of input and output circuit nodes from said plurality of circuit nodes, wherein said user selection forms a group of cut nodes, and wherein circuit nodes that are within the plurality of circuit nodes but are outside of said group of cut nodes form a group of noncut nodes;
analyze a plurality of input signals to circuit nodes of said group of noncut nodes;

determine to replace, in a visualization of the plurality of circuit nodes, two or more of the circuit nodes of said group of noncut nodes with a cloud node, wherein said determining is based upon the analyses of the input signals; and render on a display, a visualization of the plurality of circuit nodes, wherein a cloud node replaces two or more circuit nodes of said group of noncut nodes, and wherein the cloud node is located between at least one input circuit node of the group of cut nodes and at least one output circuit node of the group of cut nodes;

wherein the determined two or more circuit nodes of said group of noncut nodes are the two or more noncut nodes replaced by the cloud node, and wherein the rendering comprises ceasing to display the determined two or more circuit nodes and displaying the cloud node in their place.

22. At least one non-transitory computer readable storage medium having computer program instructions stored thereon that are arranged to perform the following operations:

receiving, at a computer, a design including a plurality of circuit nodes, wherein circuit nodes of the plurality of circuit nodes are interconnected via a plurality of paths;

receiving a user selection of a plurality of input and output circuit nodes from said plurality of circuit nodes, wherein said user selection forms a group of cut nodes, and wherein circuit nodes that are within the plurality of circuit nodes but are outside of said group of cut nodes form a group of noncut nodes;

analyzing a plurality of input signals to circuit nodes of said group of noncut nodes;

determining to replace, in a visualization of the plurality of circuit nodes, two or more of the circuit nodes of said group of noncut nodes with a cloud node, wherein said determining is based upon the analyses of the input signals; and rendering on a display, a visualization of the plurality of circuit nodes, wherein a cloud node replaces two or more circuit nodes of said group of noncut nodes, and wherein the cloud node is located between at least one input circuit node of the group of cut nodes and at least one output circuit node of the group of cut nodes;

wherein the determined two or more circuit nodes of said group of noncut nodes are the two or more noncut nodes replaced by the cloud node, and wherein the rendering comprises ceasing to display the determined two or more circuit nodes and displaying the cloud node in their place.

* * * * *